(12) United States Patent
Jung et al.

(10) Patent No.: US 7,710,918 B2
(45) Date of Patent: May 4, 2010

(54) PILOT DESIGNING METHOD IN AN UPLINK OFDMA SYSTEM

(75) Inventors: Young-Ho Jung, Yongin-si (KR); Jae-Hak Chung, Seoul (KR); Chan-Soo Hwang, Yongin-si (KR); Seung-Hoon Nam, Seoul (KR); Yong-Hoon Lee, Daejeon (KR); Hong-Sun Park, Daejeon (KR)

(73) Assignees: Samsung Electronics Co., Ltd (KR); Korea Advanced Institute of Science & Technology (KR)

( * ) Notice: Subject to any disclaimer, the term of this patent is extended or adjusted under 35 U.S.C. 154(b) by 1452 days.

(21) Appl. No.: 11/078,157

(22) Filed: Mar. 11, 2005

(65) Prior Publication Data

US 2005/0243939 A1    Nov. 3, 2005

(30) Foreign Application Priority Data

Mar. 11, 2004   (KR)   .................... 10-2004-0016552
Nov. 26, 2004   (KR)   .................... 10-2004-0098174

(51) Int. Cl.
    *H04W 4/00*   (2006.01)
(52) U.S. Cl. .................................................. 370/329
(58) Field of Classification Search ................ 370/321, 370/336–338, 345–348, 328, 329
    See application file for complete search history.

(56) References Cited

U.S. PATENT DOCUMENTS

| | | | |
|---|---|---|---|
| 2002/0086708 A1 | 7/2002 | Teo et al. | |
| 2004/0166886 A1* | 8/2004 | Laroia et al. | 455/522 |
| 2005/0135324 A1* | 6/2005 | Kim et al. | 370/343 |
| 2006/0002360 A1* | 1/2006 | Ji et al. | 370/343 |
| 2006/0025079 A1* | 2/2006 | Sutskover et al. | 455/67.11 |
| 2006/0067278 A1* | 3/2006 | Li et al. | 370/335 |
| 2006/0279435 A1* | 12/2006 | Krishnan et al. | 341/29 |
| 2007/0066273 A1* | 3/2007 | Laroia et al. | 455/343.2 |
| 2007/0213087 A1* | 9/2007 | Laroia et al. | 455/522 |

FOREIGN PATENT DOCUMENTS

| | | |
|---|---|---|
| EP | 1 249 949 | 10/2002 |
| WO | WO 02/087139 | 10/2002 |

* cited by examiner

*Primary Examiner*—Lester Kincaid
*Assistant Examiner*—Nathan Mitchell
(74) *Attorney, Agent, or Firm*—The Farrell Law Firm, LLP

(57) ABSTRACT

A pilot designing method in an uplink OFDMA system is provided. In the uplink OFDMA system, communications are carried out in a frame divided into time-frequency lattices, and each time-frequency lattice includes a plurality of data symbol periods and a plurality of pilot symbol periods intermittently arranged with respect to the data symbol periods. The frame is divided into a plurality of blocks. The blocks are allocated to the terminals. A predetermined allocated pilot time-frequency lattice is shared between adjacent terminals.

17 Claims, 12 Drawing Sheets

PILOT DESIGNING METHOD IN AN UPLINK OFDMA SYSTEM

PRIORITY

This application claims priority under 35 U.S.C. §119 to an application entitled "Pilot Designing Method in an Uplink OFDMA System" filed in the Korean Intellectual Property Office on Mar. 11, 2004 and Nov. 26, 2004 and assigned Serial Nos. 2004-16552 and 98174-2004, respectively, the contents each of which are incorporated herein by reference.

BACKGROUND OF THE INVENTION

1. Field of the Invention

The present invention relates generally to a mobile communication system, and in particular, to a pilot designing method for channel estimation on the uplink in an orthogonal frequency division multiple access (OFDMA) system.

2. Description of the Related Art

High-speed, high-quality data transmission is required for next-generation mobile communications to provide a variety of multimedia services with improved quality.

Orthogonal Frequency Division Multiplexing (OFDM), on which OFDMA is based, boasts high-speed communication due to low equalization complexity for frequency-selective fading channels. Thus, OFDM is widely used as a physical layer transmission scheme in various wireless communication systems including wireless local access network (WLAN), digital TV broadcasting, and next-generation mobile communication systems.

OFDMA is a multiple access scheme of allocating different subcarriers to a plurality of users. On the downlink, all users can use pilot information for channel estimation, which facilitates pilot transmission and channel estimation. On the uplink, however, when a particular use transmits pilot information in a predetermined pilot sample, other users are prohibited from using the same pilot sample. Therefore, many users share a fixed number of pilot samples. The limit of the pilot information which is available to each user degrades channel estimation performance.

FIGS. 1A and 1B are graphs which illustrate subcarrier allocation to users in a known uplink OFDMA system.

Referring to FIGS. 1A and 1B, the uplink OFDMA system allocates resources to users, each on the basis of a transport block 110 within the same frame. The transport block 110 comprises data subcarriers 103 and pilot subcarriers 105. Only a pilot channel in the transport block 110 is used for channel estimation of the user allocated to the transport block 110.

FIG. 2 is a channel gain graph illustrating interpolation-based channel estimation in the uplink OFDMA system. When user #1 and user #2 are allocated to resources within the same frame, pilot subcarriers 205a of user #1 and pilot subcarriers 205b of user #2 are arranged equidistantly on the frequency domain. The channel between the pilot subcarriers 205a (or 205b) is estimated by interpolating the channel estimates of pilots within the transport block of user #1 (or user #2). However, at the boundary A between the transport blocks of the two users, a pilot subcarrier is nonexistent for user #1 on the outside of his transport block and thus a reference channel estimate is not available for interpolation. As a result, a channel estimation error increases, which leads to the degradation of the whole data detection performance. To solve this problem, it has been proposed that an additional pilot subcarrier be allocated at the boundary A, or that a pilot subcarrier be disposed at the boundary without increasing the number of pilot subcarriers. Yet, the additional pilot subcarrier allocation decreases band efficiency, and the arrangement of pilot subcarriers at wider intervals without increasing the number of the pilot subcarriers increases a channel variation between pilot subcarriers, thereby increasing a channel estimation error.

SUMMARY OF THE INVENTION

An object of the present invention is to substantially solve at least the above problems and/or disadvantages and to provide at least the advantages below. Accordingly, an object of the present invention is to provide a pilot designing method for maximizing channel estimation efficiency, while maintaining the number of pilot subcarriers in a transport block allocated to each user in an uplink OFDMA frame.

Another object of the present invention is to provide a pilot designing method for maximizing channel estimation efficiency by sharing pilot subcarriers between users allocated to adjacent transport blocks in an OFDMA frame.

A further object of the present invention is to provide a pilot designing method for maximizing channel estimation efficiency by exchanging pilot symbols between users allocated to adjacent transport blocks in an OFDMA frame.

The above objects are achieved by providing a pilot designing method in an uplink OFDMA system.

According to one aspect of the present invention, in a pilot designing method in an uplink OFDMA system where communications are carried out in a frame divided into time-frequency lattices, and each time-frequency lattice includes a plurality of data symbol periods and a plurality of pilot symbol periods intermittently arranged with respect to the data symbol periods, the frame is divided into a plurality of blocks, the blocks are allocated to the terminals, and a predetermined allocated pilot time-frequency lattice is shared between adjacent terminals.

According to another aspect of the present invention, in a data transmitting method in an uplink OFDMA system where, for communications, a frame with time-frequency lattices, each including a plurality of data symbol periods and a plurality of pilot symbol periods intermittently arranged with respect to the data symbol periods, is divided into a plurality of blocks, and the blocks are allocated to the terminals, data signals and pilot signals of each terminal are arranged in the data symbol periods and the pilot symbol periods of a block allocated to the terminal, a transmission frame is generated by inserting pilot signals of the terminal in predetermined pilot time-frequency lattices of an adjacent block allocated to a different terminal, and the transmission frame is transmitted.

According to a further aspect of the present invention, in a data transmitting method in an uplink OFDMA system where, for communications, a frame having time-frequency lattices, each including a plurality of data symbol periods and a plurality of pilot symbol periods intermittently arranged with respect to the data symbol periods, is divided into a plurality of blocks, and the blocks are allocated to the terminals, data signals and pilot signals of each terminal are arranged in the data symbol periods and the pilot symbol periods of a block allocated to the terminal, one of at least two time-frequency lattices of a first pilot symbol period of the terminal is emptied for filling a pilot signal of a different terminal in the empty time-frequency lattice, a transmission frame is generated by inserting a pilot signal of the terminal in an empty pilot time-frequency lattice among at least two pilot time-frequency lattices of an adjacent block allocated to the different terminal, and the transmission frame is transmitted.

According to still another aspect of the present invention, in a channel estimation method in an uplink OFDMA system where, for communications, a frame having time-frequency lattices, each including a plurality of data symbol periods and a plurality of pilot symbol periods intermittently arranged with respect to the data symbol periods, is divided into a plurality of blocks, and the blocks are allocated to the terminals, a frame is received which has time-frequency lattices shared between adjacent blocks, and a channel of each of the terminals is estimated using a pilot signal included in a time-frequency lattice shared with an adjacent block allocated to a different terminal.

According to yet another aspect of the present invention, in a channel estimation method in an uplink OFDMA system where, for communications, a frame having time-frequency lattices, each including a plurality of data symbol periods and a plurality of pilot symbol periods intermittently arranged with respect to the data symbol periods, is divided into a plurality of blocks, and the blocks are allocated to the terminal, a frame is received which has time-frequency lattices exchanged between adjacent blocks, and a channel of each of the terminals is estimated using a pilot signal included in a time-frequency lattice exchanged from an adjacent block allocated to a different terminal.

According to further another aspect of the present invention, in a pilot designing method in an uplink OFDMA system where communications are carried out in a frame divided into time-frequency lattices, each time-frequency lattice being identified by frequency-axis subcarrier indexes and time-axis symbol period indexes and including a plurality of intermittently arranged pilot subcarriers, the frame is divided into transport blocks of a predetermined size and the transport blocks are allocated to terminals. Pilot subcarriers of adjacent transport blocks allocated to different terminals are shared between them in at least one symbol period.

A transport block allocated to each terminal is preferably shared by at least two antennas of the terminal. Moreover, these antennas preferably map orthogonal pilot signals to pilot subcarriers in the transport block.

Furthermore, a pilot subcarrier is preferably shared by the different terminals during four symbol periods and can be selectively allocated to the two antennas of the terminal for two successive symbol periods. It is also preferable that the pilot subcarrier be allocated to the two antennas of the terminal for the same two successive symbol periods.

Moreover, a pilot signal is preferably mapped to pilot subcarriers having different indexes in the transport block for different symbol periods. It is also preferable that the pilot signals mapped to the two antennas of the terminal are orthogonal. The pilot subcarrier is also preferably selectively allocated to the two antennas of the terminal for a different symbol period.

According to yet further aspect of the present invention, in a pilot designing method in an uplink OFDMA system where communications are carried out in a frame divided into time-frequency lattices, each time-frequency lattice being identified by frequency-axis subcarrier indexes and time-axis symbol period indexes and including a plurality of intermittently arranged pilot symbol periods, the frame is divided into transport blocks of a predetermined size and the transport blocks are allocated to terminals. Pilot symbol periods of adjacent transport blocks allocated to different terminals are shared between them in at least one subcarrier.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to increase the channel estimation performance of a base station by sharing or exchanging pilot subcarriers between users allocated to adjacent blocks in an uplink OFDMA system.

In the pilot sharing method, two users having adjacent transport blocks share the same pilot subcarrier using orthogonal pilot patterns. In the pilot exchanging method, two users having adjacent transport blocks at a particular time exchange at least one of the pilot subcarriers.

Figure 1A:
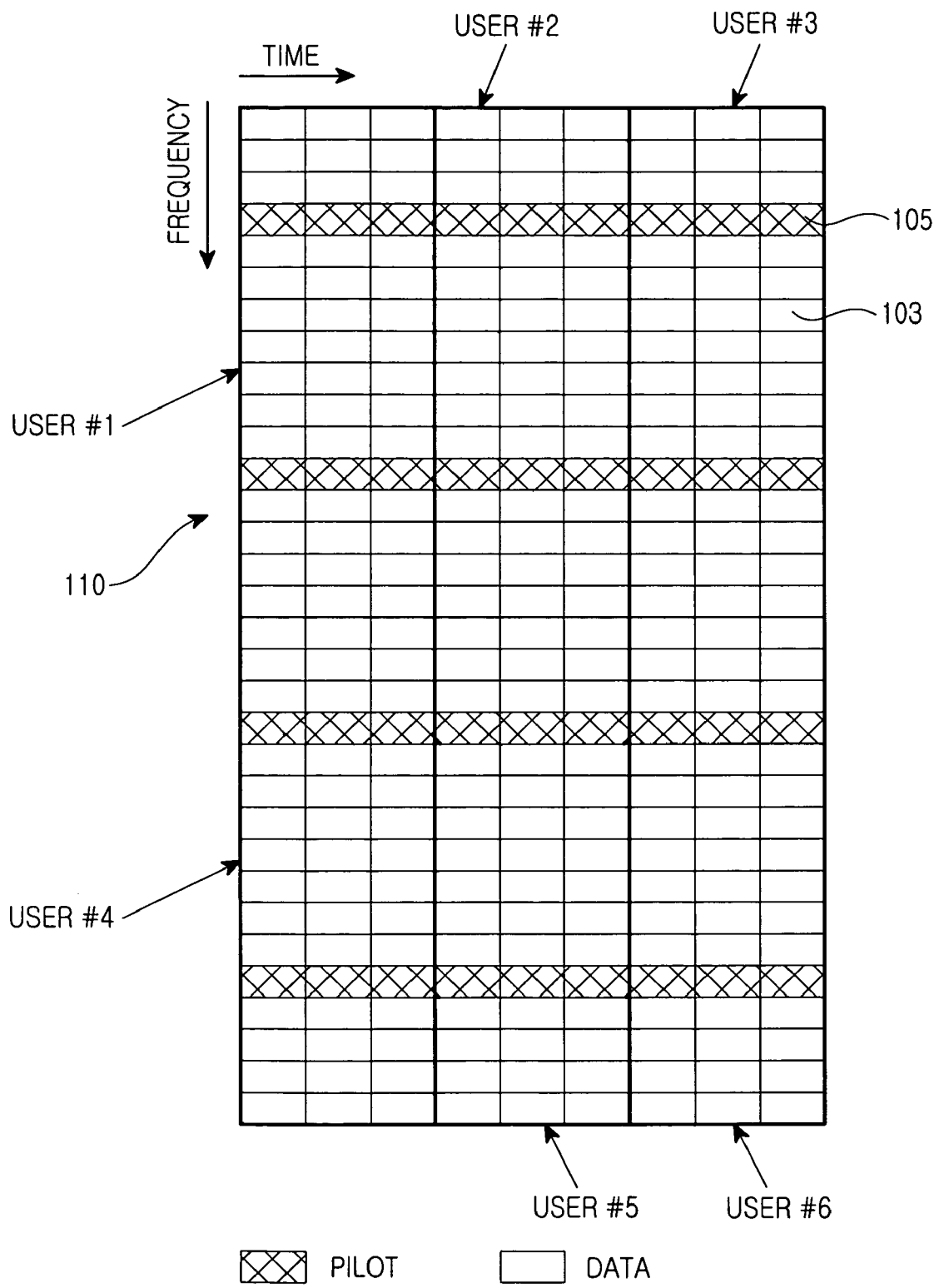
FIG. 1A is a graph which illustrates an example of resources allocation to each user in an uplink OFDMA system.
Figure 1B:
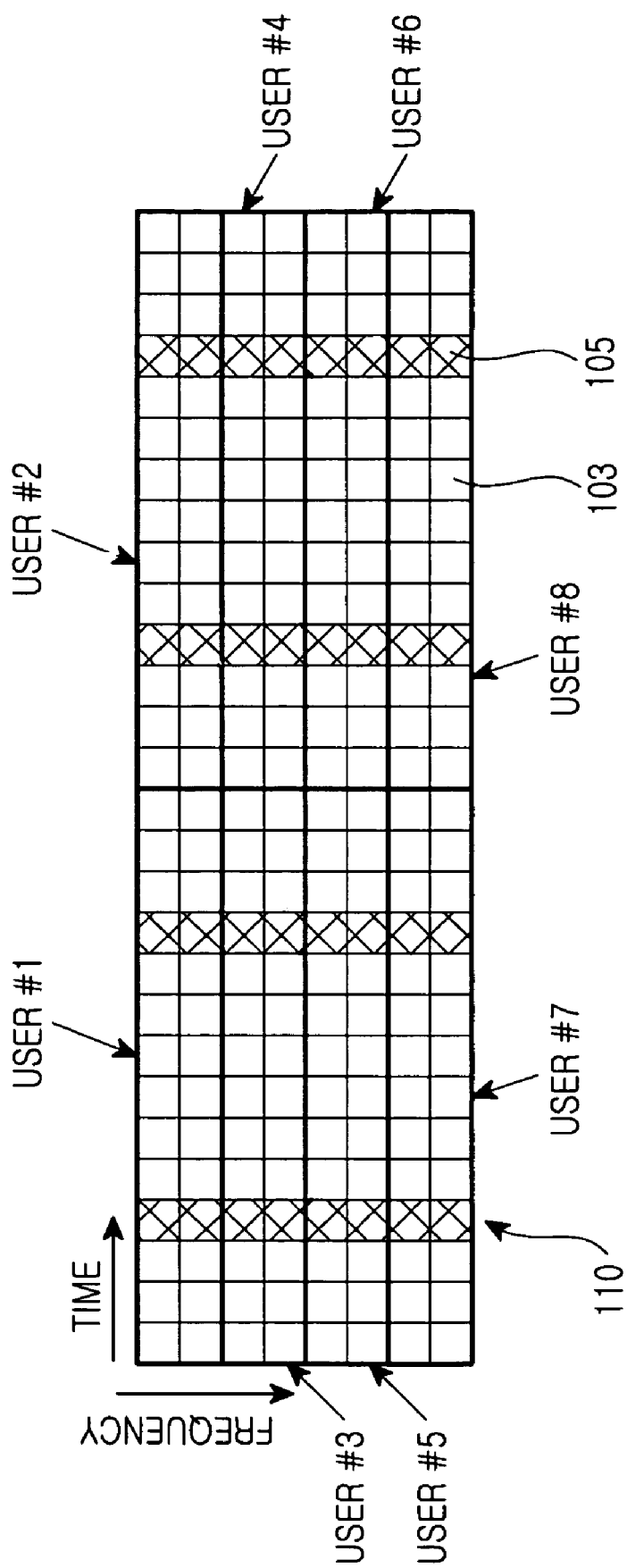
FIG. 1B is a graph which illustrates another example of resources allocation to each user in the uplink OFDMA system.
Figure 2:
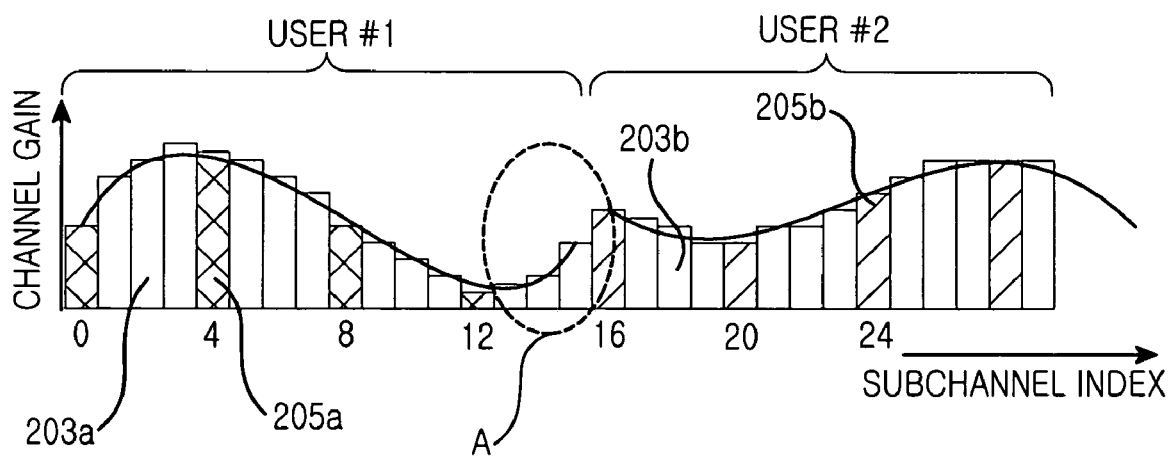
FIG. 2 is a channel gain graph illustrating the interpolation-based channel estimation of a conventional uplink OFDMA system.
Figure 3:
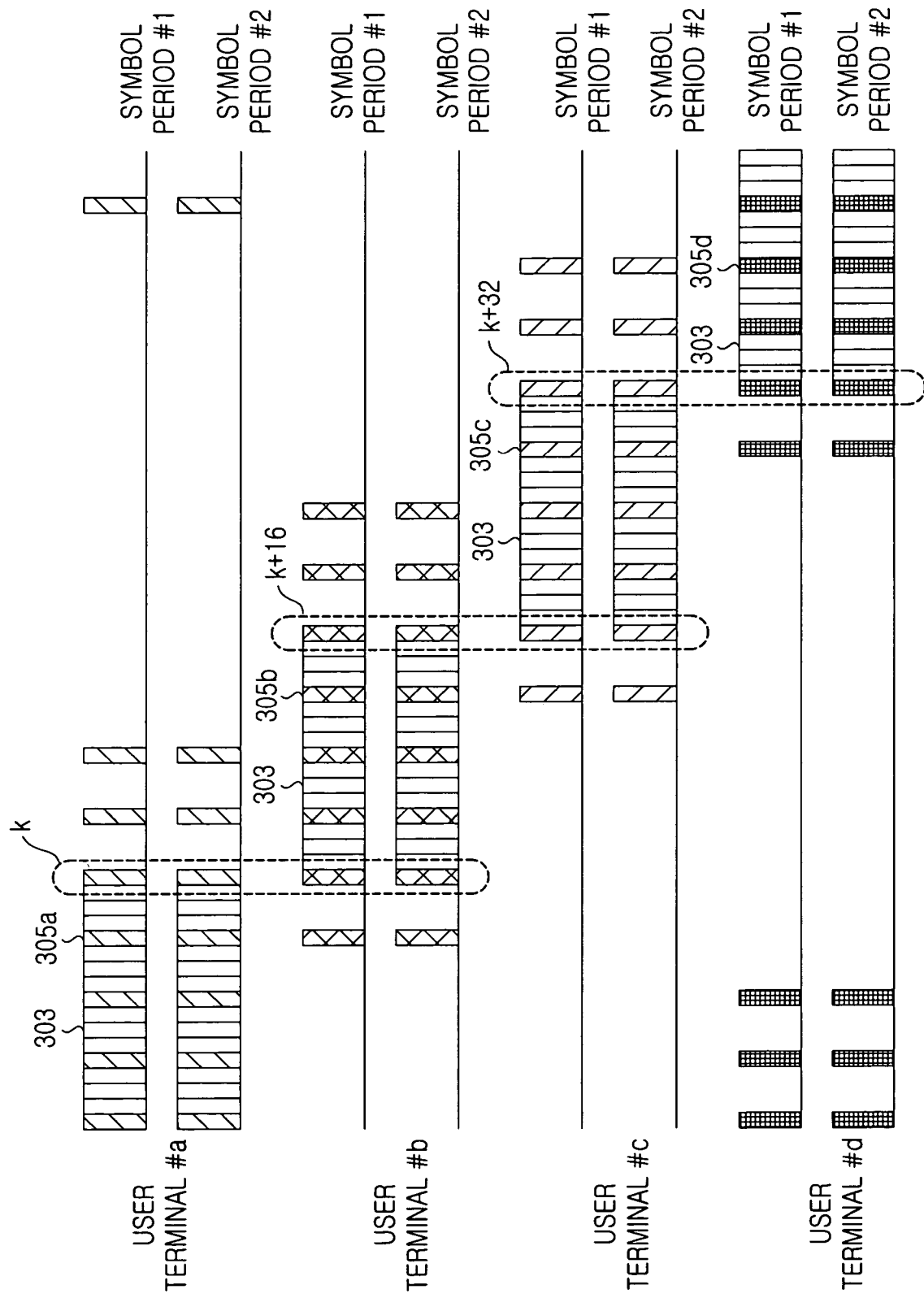
FIG. 3 is a conceptual view illustrating a pilot designing method according to an embodiment of the present invention.

FIG. 3 is a conceptual view illustrating a pilot designing method according to an embodiment of the present invention.

For notational simplicity, it is assumed that there are four user terminals allocated to adjacent transport blocks and each transport block includes 16 subcarriers for two successive symbol periods.

Referring to FIG. 3, user terminal #a, user terminal #b, user terminal #c, and user terminal #d each is allocated a transport block including data subcarriers 303 which are not overlapped with data subcarriers 303 of the other user terminals in two symbol periods. However, some of pilot subcarriers 305a, 305b, 305c and 305d are shared by at least two users at subcarrier indices #k, #k+16, and #k+32.

Typically, pilot subcarriers are arranged intermittently and it is preferable to design the pilot subcarriers such that the distance between adjacent pilot subcarriers is not wider than a coherent bandwidth.

Taking the transport blocks of user terminal #a and user terminal #b for an example, the first subcarrier (i.e. the subcarrier #k) of the transport block of user terminal #b is a pilot subcarrier. User terminal #b shares the pilot subcarrier #k with user terminal #a. Notably, user terminal #a and user terminal #b use mutually orthogonal pilot patterns [1 1] and [1 −1], respectively.

In the pilot design according to the embodiment of the present invention, the maximum number of additional pilot subcarriers available to one user terminal through pilot sharing with its adjacent user terminal is calculated in the following manner. Let the total number of pilot subcarriers in an OFDM symbol be denoted by $N_{Pilot}$ and the number of multiple access terminals be denoted by $N_{User}$. Then, the original number ($N_{Original}$) of pilot subcarriers equally available to each user is set forth in Equation (1):

$$N_{Original} = \frac{N_{Pilot}}{N_{User}} \quad \text{Equation (1)}$$

If every two adjacent users share a pilot subcarrier, each user can be additionally allocated as many pilot subcarriers as the number of originally allocated pilot subcarriers. Therefore, the total number of pilot subcarriers ($N_{Total}$) allocated to one user is computed as shown in Equation (#2):

$$N_{Total} = 2\frac{N_{Pilot}}{N_{User}} \quad \text{Equation (2)}$$

Given $N_{Pilot}$=16 and $N_{User}$=4, 8 pilot subcarriers are allocated to each user in the pattern illustrated in FIG. 3.

When two adjacent users A and B share the subcarrier #k, signals received at the base station for $n^{th}$ and $(n+1)^{th}$ symbol periods are, under the assumption that the channels of users A and B minimally changed for the symbol periods, expressed as Equations (3) and (4):

$$Y_n(k) = H^A(k)X_n^A(k) + H^B(k)X_n^B(k) + W_n(k) \quad \text{Equation (3)}$$

$$Y_{n+1}(k) = H^A(k)X_{n+1}^A(k) + H^B(k)X_{n+1}^B(k) + W_{n+1}(k) \quad \text{Equation (4)}$$

where $X_n^A(k)$ and $X_n^B(k)$ are transmission signals on the subcarrier #k of an $n^{th}$ OFDM symbol from users A and B, $H^A(k)$ and $H^B(k)$ are the channel coefficients of the subcarrier #k for users A and B, $W_n(k)$ is the additive white Gaussian noise (AWGN) of the subcarrier #k in the $n^{th}$ OFDM symbol, and $Y_n(k)$ is the signal received on the subcarrier #k of the $n^{th}$ OFDM symbol.

The above Equation (3) and Equation (4) are equivalent to the following matrix (5):

$$\begin{bmatrix} Y_n(k) \\ Y_{n+1}(k) \end{bmatrix} = \begin{bmatrix} X_n^A(k) & X_n^B(k) \\ X_{n+1}^A(k) & X_{n+1}^B(k) \end{bmatrix} \begin{bmatrix} H^A(k) \\ H^B(k) \end{bmatrix} + \begin{bmatrix} W_n(k) \\ W_{n+1}(k) \end{bmatrix} \quad \text{Equation (5)}$$

which can be further simplified to the following Equation (6):

$$y(k) = X(k)h(k) + w(k) \quad \text{Equation (6)}$$

where $Y_n(k)$ is a signal received at the $n_{th}$ period through the $k_{th}$ subcarrier, $X_n(k)$ is a signal transmitted at the $n_{th}$ period through the $k_{th}$ subcarrier, H(k) is a channel coefficient of kth channel, W(k) is additive white Gaussian noise (AWGN) and k is the generalized subcarrier index. All of those are defined right above the Equation 5.

It is noted from the above equations that an equation for achieving the channel of the pilot subcarrier shared between users A and B is represented as an AWGN-added linear equation. If the inverse of X(k), which is $X(k)^{-1}$ exists, the maximum likelihood (ML) estimate of the pilot subcarrier channel of users A and B can be expressed as Equation (7):

$$\hat{h}(k)_{ML} = X(k)^{-1}y(k) \quad \text{Equation (7)}$$

The mean squared error (MSE) of the estimated pilot subcarrier channel is computed as shown in Equation (8):

$$MSE = \sigma^2 \cdot tr((X^H X)^{-1}) \quad \text{Equation (8)}$$

where $\sigma^2$ is the noise variance, and X is a unitary matrix minimizing the MSE and is characterized by $$XX^H = X^H X = \alpha I \quad \text{Equation (9)}$$

where I is an Identity matrix.

When the users sharing the pilot subcarrier use mutually orthogonal patterns such as [1 1] and [1 −1], the above condition is satisfied. Consequently, optimum channel estimation performance is achieved.

The present invention utilizes a polynomial interpolation function to estimate data subcarrier channels. Specifically, three data subcarrier channels between pilot subcarriers are estimated by calculating the coefficient of a third-order polynomial function using two pilot subcarriers on the left and two pilot subcarriers on the right of the data subcarriers, and then using the resulting polynomial interpolation function.

Meanwhile, a system in which two user terminals use two or more transmit antennas can be considered. In a multiple-antenna OFDMA system using $N_{TX}$ transmit antennas, the number of channel parameters to be estimated using a shared or exchanged pilot subchannel is $2N_{TX}$. Therefore, at least $2N_{TX}$ linear formulas are needed for the estimation. For example, if two transmit antennas are used and a kth pilot subcarrier is shared, linear formulas are required for four received signals and the received signals at the base station for nth to (n+3)th OFDM symbol periods are expressed as defined in Equation (10) below. It is assumed herein that the channels of user A and user B are not changed for the four OFDM symbol periods.

$$\begin{bmatrix} Y_k(n) \\ Y_k(n+1) \\ Y_k(n+2) \\ Y_k(n+3) \end{bmatrix} = \quad \text{Equation (10)}$$

-continued $$\begin{bmatrix} X_{k,1}^A(n) & X_{k,2}^A(n) & X_{k,1}^B(n) & X_{k,2}^B(n) \\ X_{k,1}^A(n+1) & X_{k,2}^A(n+1) & X_{k,1}^B(n+1) & X_{k,2}^B(n+1) \\ X_{k,1}^A(n+2) & X_{k,2}^A(n+2) & X_{k,1}^B(n+2) & X_{k,2}^B(n+2) \\ X_{k,1}^A(n+3) & X_{k,2}^A(n+3) & X_{k,1}^B(n+3) & X_{k,2}^B(n+3) \end{bmatrix}$$

$$\begin{bmatrix} H_{k,1}^A \\ H_{k,2}^A \\ H_{k,1}^B \\ H_{k,2}^B \end{bmatrix} + \begin{bmatrix} W_k(n) \\ W_k(n+1) \\ W_k(n+2) \\ W_k(n+3) \end{bmatrix}$$

where $X_{k,i}^A$ and $X_{k,i}^B$ are kth subcarrier signals in an nth OFDM symbol from ith transmit antennas of user A and user B, $H_{k,i}^A$ and $H_{k,i}^B$ are channel coefficients from kth transmit antennas of user a and user B in the nth to (n+3)th OFDM symbols, $W_k(n)$ is the AWGN of the kth subcarrier in the nth OFDM symbol, and $Y_k(n)$ is a signal received on the kth subcarrier in the nth OFDM symbol.

In the embodiment of the present invention, 4 pilot subcarriers are allocated to each user terminal and a total of 8 pilot subcarriers are available to each user terminal through pilot sharing with its adjacent user terminal.

Since the same data subcarriers are estimated by using twice as many pilot subcarriers as those originally allocated to a user terminal, a more accurate channel estimation is enabled.

Figure 4:
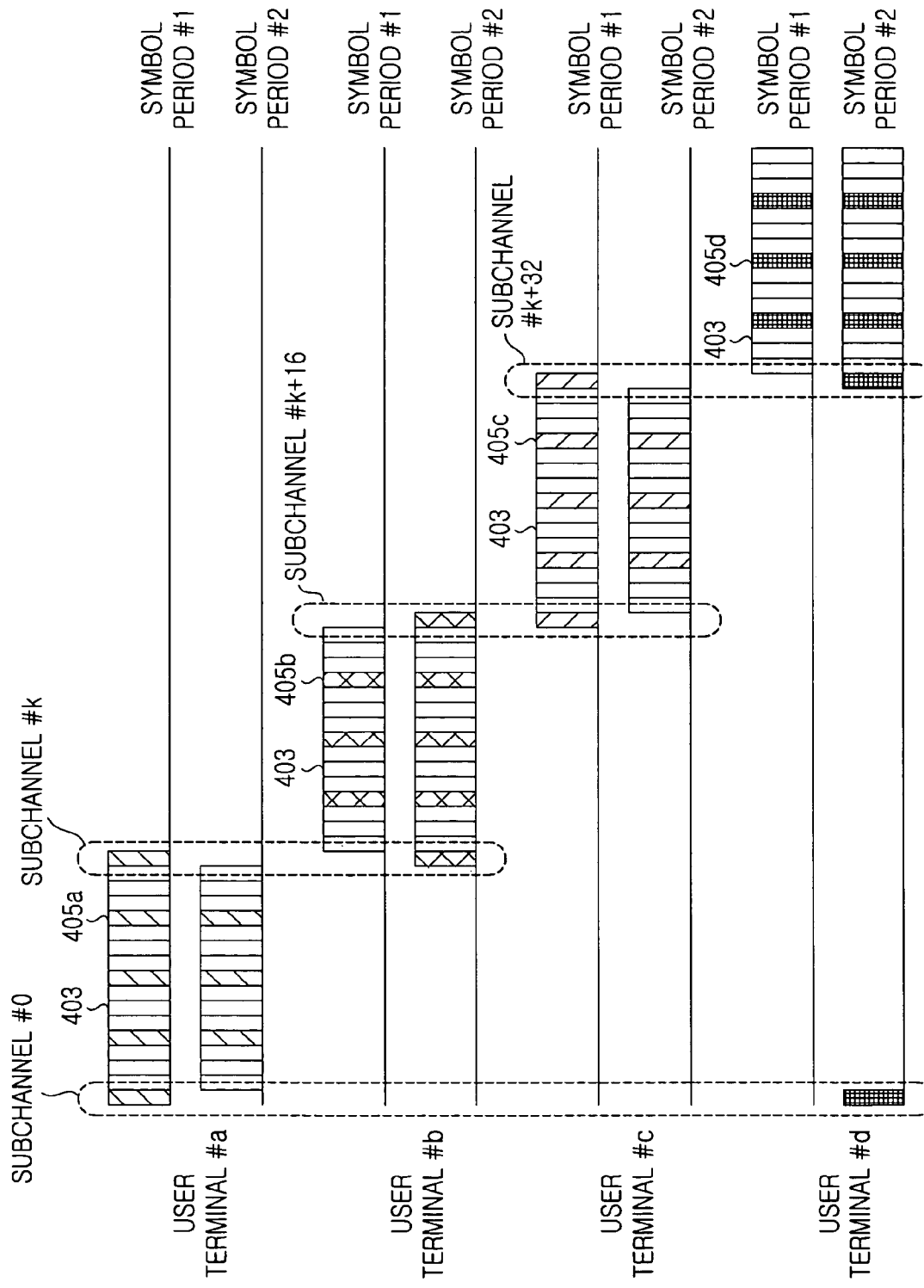
FIG. 4 is a conceptual view illustrating a pilot designing method according to another embodiment of the present invention.

FIG. 4 is a conceptual view illustrating a pilot designing method according to a second embodiment of the present invention.

As in the first embodiment of the present invention, it is assumed that there are four user terminals allocated to adjacent transport blocks, each transport block includes 16 subcarriers for two successive symbol periods, and the channels do not change for the symbol periods.

Referring to FIG. 4, user terminal #a, user terminal #b, user terminal #c, and user terminal #d are each allocated a transport block including data subcarriers 403 which are not overlapped with data subcarriers 403 of the other user terminals in two symbol periods.

In symbol period #1, user terminal #a uses a pilot subcarrier which is located at a pilot subcarrier position #k which is allocated to user terminal #b as its own, and user terminal #c uses a pilot subcarrier which is located at a pilot subcarrier position #(k+32)$^{th}$ which is allocated to user terminal #d as its own.

In symbol period #2, user terminal #b uses a pilot subcarrier which is located at a pilot subcarrier position #(k+16)$^{th}$ which is allocated to user terminal #c as its own, and user terminal #d uses the first pilot subcarrier which is located at a pilot subcarrier position #0 allocated to user terminal #a as its own.

As described above, each user terminal uses a pilot subcarrier which is allocated to its adjacent user terminal in one of two symbol periods assumed that there are no channel variations. Thus, channel estimation is done more accurately.

In the second embodiment of the present invention, because adjacent user terminals use the same symbol alternately in different symbol periods, there is no need for maintaining orthogonality between pilot subcarriers.

Figure 5:
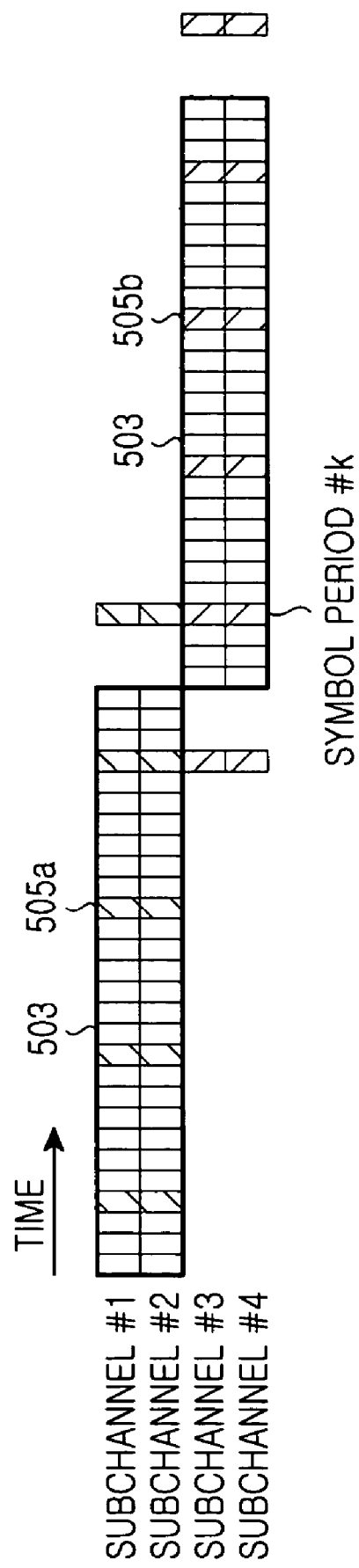
FIG. 5 is a conceptual view illustrating a pilot designing method according to a third embodiment of the present invention.

FIG. 5 is a conceptual view illustrating a pilot designing method according to a third embodiment of the present invention.

For notational simplicity, it is assumed that there are two user terminals allocated to adjacent transport blocks, and each transport block includes 2 subcarriers for 28 successive symbol periods.

Referring to FIG. 5, user terminal #a and user terminal #b are allocated pilot symbol periods 505a and 505b respectively, which are intermittent with respect to data symbol periods 503. At the end time area of the transport block of user terminal #a, there is no pilot symbol period. Hence, user terminal #a shares a pilot symbol period #k which is allocated to user terminal #b. User terminals #a and #b use orthogonal pilot patterns [1 1] and [1 −1].

Figure 6:
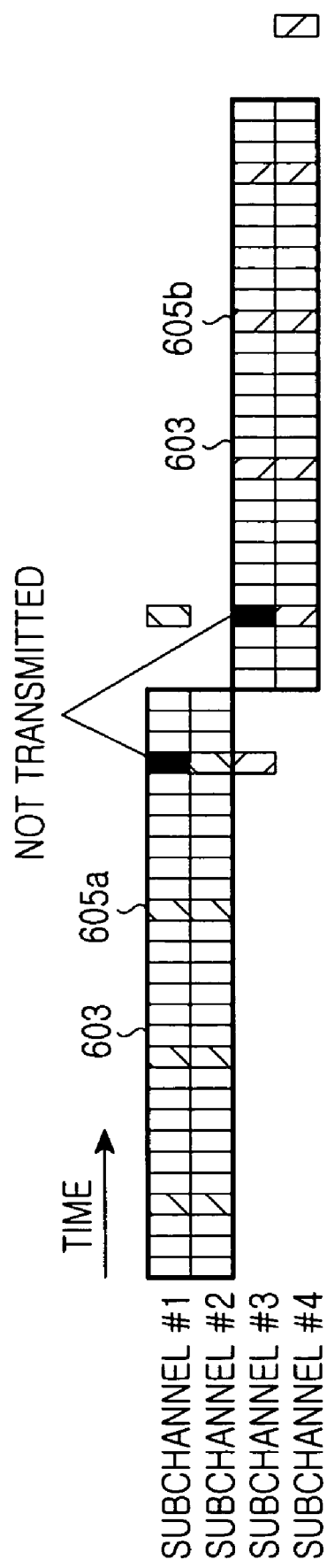
FIG. 6 is a conceptual view illustrating a pilot designing method according to a fourth embodiment of the present invention.

FIG. 6 is a conceptual view illustrating a pilot designing method according to a fourth embodiment of the present invention.

As in the third embodiment of the present invention, it is assumed that there are two user terminals allocated to adjacent transport blocks, and each transport block includes 2 subcarriers for 28 successive symbol periods.

Referring to FIG. 6, user terminal #a and user terminal #b are allocated pilot symbol periods 605a and 605b which are intermittent with respect to data symbol periods 603. To compensate for the non-existence of a pilot symbol at the end time area of the transport block of user terminal #a, the first pilot symbol period of a first subcarrier of user terminal #b is allocated to user terminal #a in the first subcarrier, and the last pilot symbol period of the first subcarrier of user terminal #a is allocated to user terminal #b in the first subcarrier.

FIGS. 7 to 10 are conceptual views illustrating pilot designing methods according to the fifth to eighth embodiments of the present invention. The pilot design in these embodiments is for a system in which a terminal uses two transmit antennas. However, the number of transmit antennas is not limited and thus, for example, the terminal may have three or more transmit antennas.

The fifth to eighth embodiments are based on the assumption that two adjacent transport blocks are allocated to two user terminals and each transport block includes 17 subcarriers for 5 symbol periods.

Figure 7:
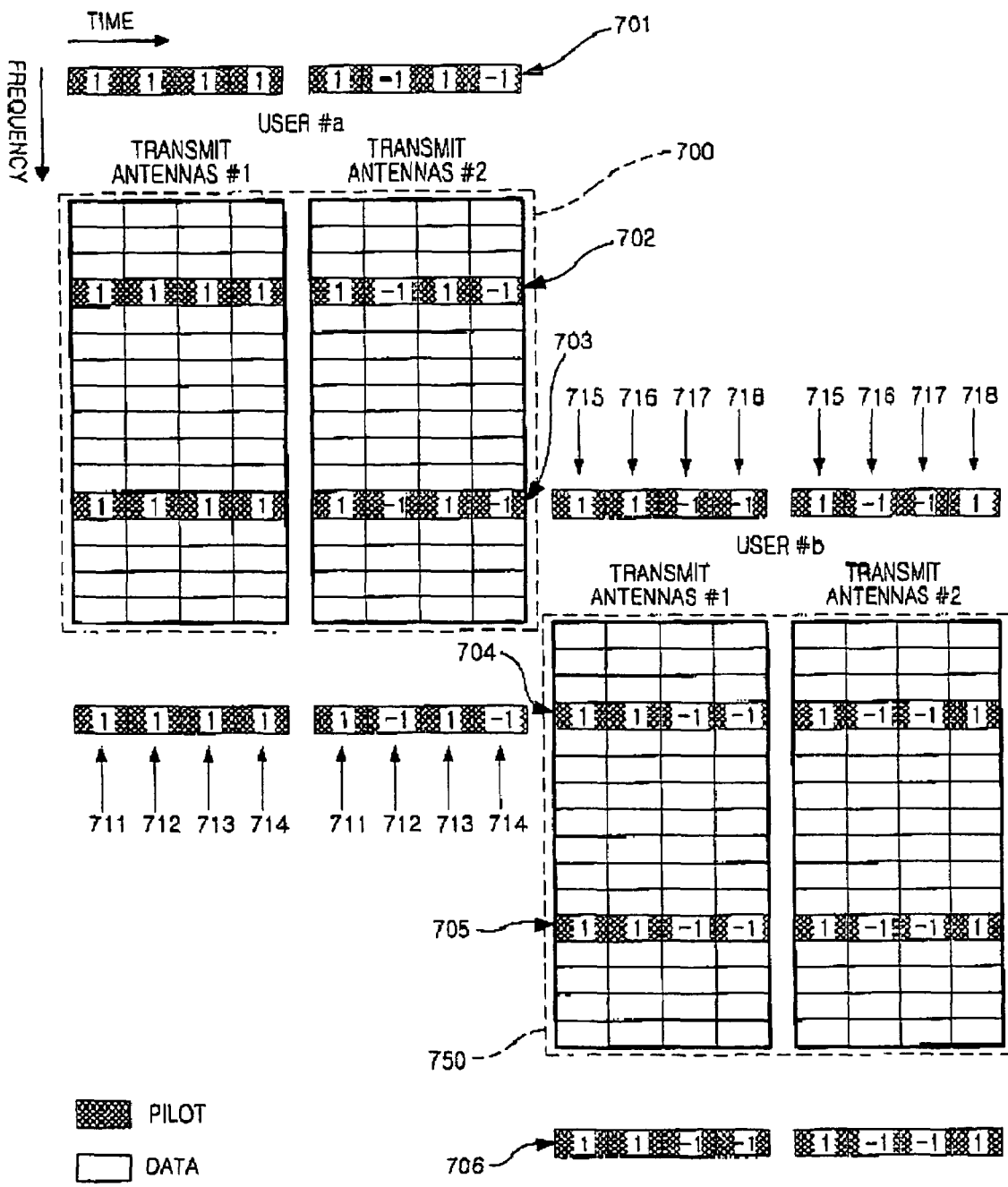
FIG. 7 is a conceptual view illustrating a pilot designing method according to a fifth embodiment of the present invention.

In FIG. 7, transport blocks 700 and 750 allocated to user terminal #a and user terminal #b include pilot subcarriers 702 to 705. To compensate for the absence of pilot subcarriers at the frequency-domain start and end of the transport block 700 for user terminal #a, the transport block 700 shares pilot subcarriers 701 and 704 allocated to other user terminals, bordering on the transport block 700. Similarly, user terminal #b borrows pilot subcarriers 703 and 706 allocated to other terminals outside his transport block 750.

First and second antennas of user terminal #a share the transport block 700 and first and second antennas of user terminal #b share the transport block 750.

In accordance with the fifth embodiment, pilot signals for the first and second antennas, which use the same pilot subcarriers to avoid interference between the antennas in the same terminal, are designed to be orthogonal with each other on the time domain.

Therefore, the first antenna of user terminal #a maps a pilot signal [1 1 1 1] and the second one maps a pilot signal [1 −1 1 −1] for four symbol periods 711 to 714. The first antenna of user terminal #b maps a pilot signal [1 1 −1 −1] and the second one maps a pilot signal [1 −1 −1 1] for four symbol periods 715 to 718.

Also, orthogonality is maintained between the antennas of the user terminals. That is, the pilot signal [1 1 1 1] of the first antenna in user terminal #a is orthogonal to the pilot signals [1 1 −1 −1] and [1 −1 −1 1] of the first and second antennas of user terminal #b.

Figure 8:
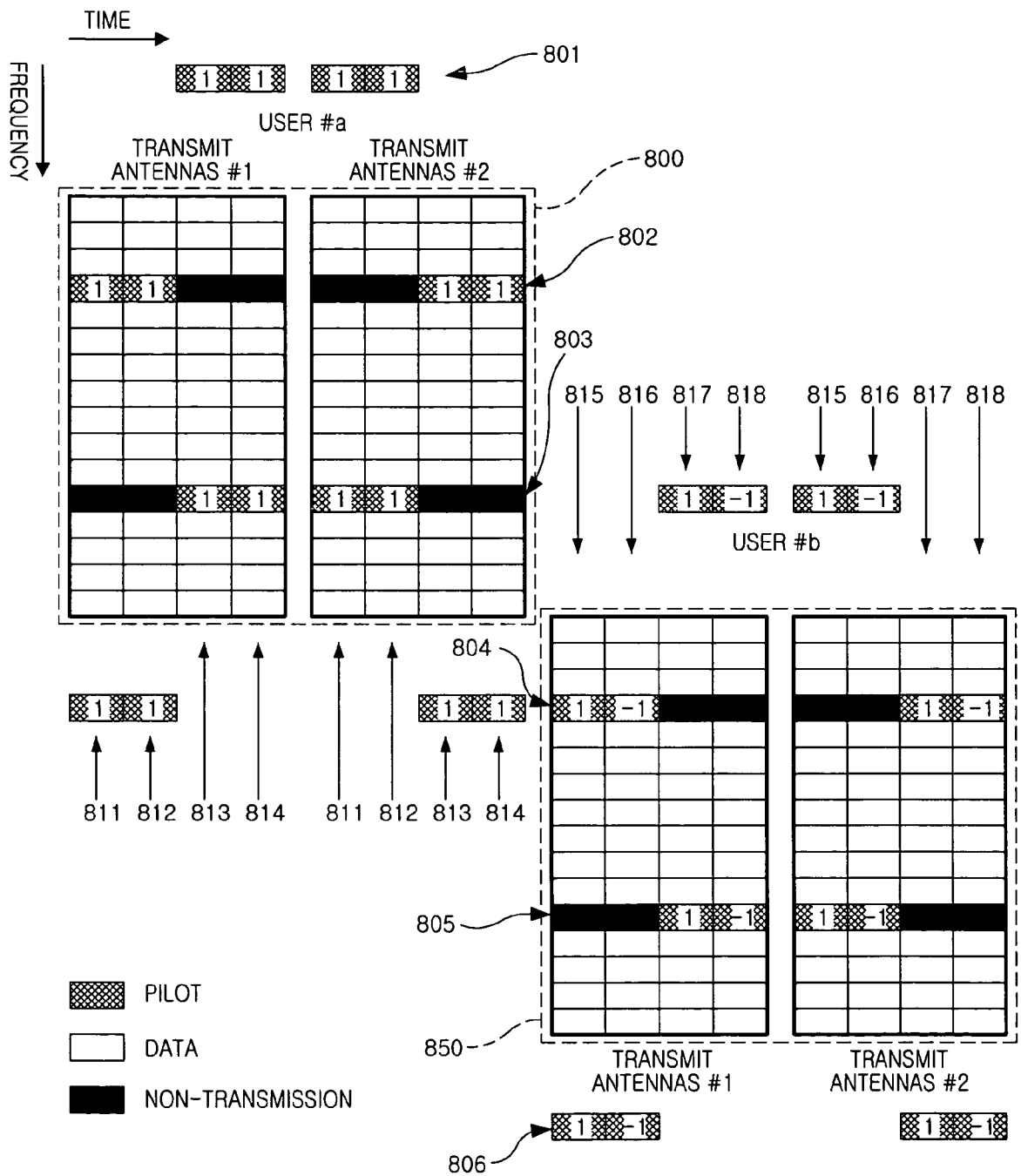
FIG. 8 is a conceptual view illustrating a pilot designing method according to a sixth embodiment of the present invention.

FIG. 8 is a conceptual view illustrating a pilot designing method according to the sixth embodiment of the present invention. Referring to FIG. 8, as in the fifth embodiment, transport blocks 800 and 850 allocated to user terminal #a and user terminal #b include pilot subcarriers 802 to 805 which are intermittently arranged with respect to data subcarriers. To compensate for the absence of pilot subcarriers at the frequency-domain start and end of the transport block 800 for user terminal #a, the transport block 800 shares pilot subcarriers 801 and 804 allocated to other user terminals, bordering on the transport block 800. First and second antennas of user terminal #a share the transport block 800 and first and second antennas of user terminal #b share the transport block 850.

In the sixth embodiment of the present invention, the first and second antennas, which use the same pilot subcarriers to avoid interference between the antennas are designed to transmit pilot signals in different symbol periods.

Specifically, the first antenna of user terminal #a maps a pilot signal [1 1] to first and second symbol periods 811 and 812 in the transport block 800 and the second antenna maps the same pilot signal [1 1] to third and fourth symbol periods 813 and 814. In the same manner, the first antenna of user terminal #b maps a pilot signal [1 −1] to first and second symbol periods 815 and 816 in the transport block 850 and the second antenna maps the same pilot signal [1 −1] to third and fourth symbol periods 817 and 818.

Also, pilot signals are mapped to pilot subcarriers having different subcarrier indexes for different two successive symbol periods in the same block.

Specifically, the first antenna of user terminal #a allocates the same pilot signal [1 1] to the first pilot subcarrier 802 in the first and second symbol periods 811 and 812 and to the second pilot subcarrier 803 in the third and fourth symbol periods 813 and 814 in the transport block 800. The second antenna of user terminal #a allocates the same pilot signal [1 1] to the first pilot subcarrier 802 in the third and fourth symbol periods 813 and 814 and to the second pilot subcarrier 803 in the first and second symbol periods 811 and 812 in the transport block 800.

The first antenna of user terminal #b allocates the same pilot signal [1 −1] to the first pilot subcarrier 804 in the first and second symbol periods 815 and 816 and to the second pilot subcarrier 805 in the third and fourth symbol periods 817 and 818 in the transport block 850. The second antenna of user terminal #b allocates the same pilot signal [1 −1] to the first pilot subcarrier 804 in the third and fourth symbol periods 817 and 818 and to the second pilot subcarrier 805 in the first and second symbol periods 815 and 816 in the transport block 850.

Figure 9:
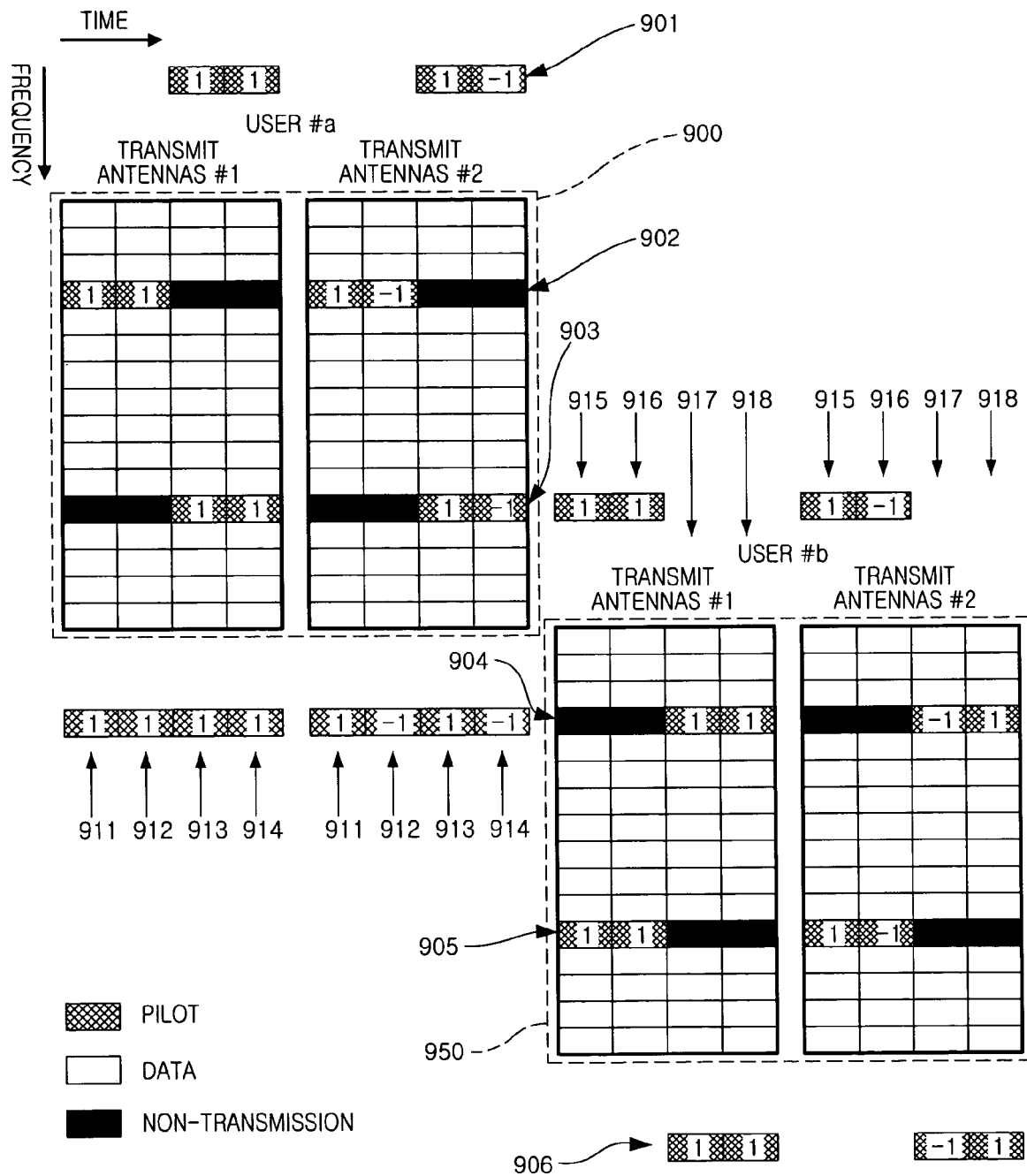
FIG. 9 is a conceptual view illustrating a pilot designing method according to a seventh embodiment of the present invention.

FIG. 9 is a conceptual view illustrating a pilot designing method according to the seventh embodiment of the present invention. Referring to FIG. 9, as in the fifth and sixth embodiments, transport blocks 900 and 950 allocated to user terminal #a and user terminal #b include pilot subcarriers 902 to 905 which are intermittently arranged with respect to data subcarriers. To compensate for the absence of pilot subcarriers at the frequency-domain start and end of the transport block 900 for user terminal #a, the transport block 900 shares pilot subcarriers 901 and 904 allocated to other user terminals, bordering on the transport block 900. First and second antennas of user terminal #a share the transport block 900 and first and second antennas of user terminal #b share the transport block 950.

In the seventh embodiment of the present invention, each of the first and second antennas, which use the same pilot subcarriers to avoid interference between the antennas, map the same pilot signal to different pilot subcarriers for different symbol periods, and the first and second antennas map orthogonal pilot signals in the same symbol period.

Therefore, the first and second antennas of user terminal #a allocate pilot signals [1 1] and [1 −1], respectively to the first pilot subcarrier 902 in the first and second symbol periods 911 and 912.

The first and second antennas of user terminal #a allocate the pilot signals [1 1] and [1 −1], respectively to the second pilot subcarrier 904 in the third and fourth symbol periods 913 and 914.

While user terminal #b maps the pilot signals in the same manner as in user terminal #a, it is preferable to map the pilot signals to be orthogonal with pilot signals from the antennas of user terminal #a.

To serve the purpose, the first and second antennas of user terminal #b allocate the pilot signals [1 1] and [1 −1], respectively to the first pilot subcarrier 904 in the third and fourth symbol periods 917 and 918 in the transport block 950. Also, the first and second antennas of user terminal #b allocate the pilot signals [1 1] and [1 −1], respectively to the second pilot subcarrier 905 in the first and second symbol periods 915 and 916 in the transport block 950.

It is noted here that the two antennas of a user terminal map different pilot signals to the same pilot subcarriers for different two successive symbol periods in the allocated transport block.

Figure 10:
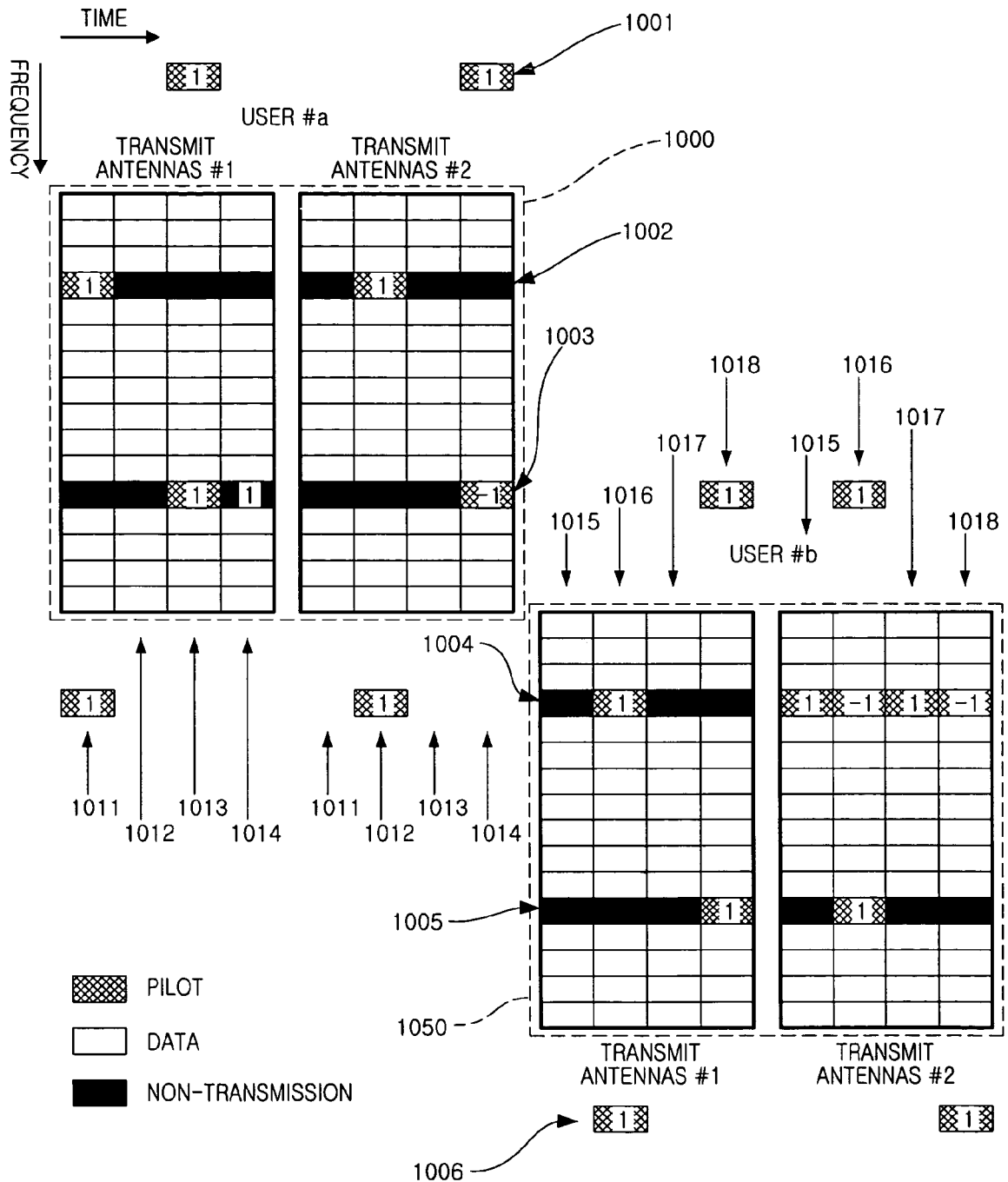
FIG. 10 is a conceptual view illustrating a pilot designing method according to a eighth embodiment of the present invention.

FIG. 10 is a conceptual view illustrating a pilot designing method according to the eighth embodiment of the present invention. Similarly to the fifth, sixth and seventh embodiments discussed above, transport blocks 1000 and 1050 allocated to user terminal #a and user terminal #b include pilot subcarriers 1002 to 1005 which are intermittently arranged with respect to data subcarriers. To compensate for the absence of pilot subcarriers at the frequency-domain start and end of the transport block 1000 for user terminal #a, the transport block 1000 shares pilot subcarriers 1001 and 1004 allocated to other user terminals, bordering on the transport block 1000. First and second antennas of user terminal #a share the transport block 1000 and first and second antennas of user terminal #b share the transport block 1050.

In the eighth embodiment of the present invention, to avoid interference between the antennas within the same terminal as well as between the terminals, the antennas of the two terminals transmit pilot signals for different symbol periods.

Therefore, the first and second antennas of user terminal #a allocate a pilot signal [1] to the first pilot subcarrier 1002 in the first and second symbol periods 1011 and 1012, respectively.

Also, the first and second antennas of user terminal #a allocate the pilot signal [1] to the second pilot subcarrier 1003 in the third and fourth symbol periods 1013 and 1014, respectively.

Meanwhile, the first and second antennas of user terminal #b allocate the pilot signal [1] to the first pilot subcarrier 1004 in the second and fourth symbol periods 1016 and 1018, respectively. Also, the first and second antennas of user terminal #b allocate the pilot signal [1] to the second pilot subcarrier 1005 in the fourth and second symbol periods 1018 and 1016, respectively.

The above-described mapping renders pilot signals to be orthogonal between the first and second antennas of the same terminal as well as between the two terminals. Therefore, interference between the terminals, between the antennas of the same terminal, and between channels of the same antenna can be avoided.

Figure 11:
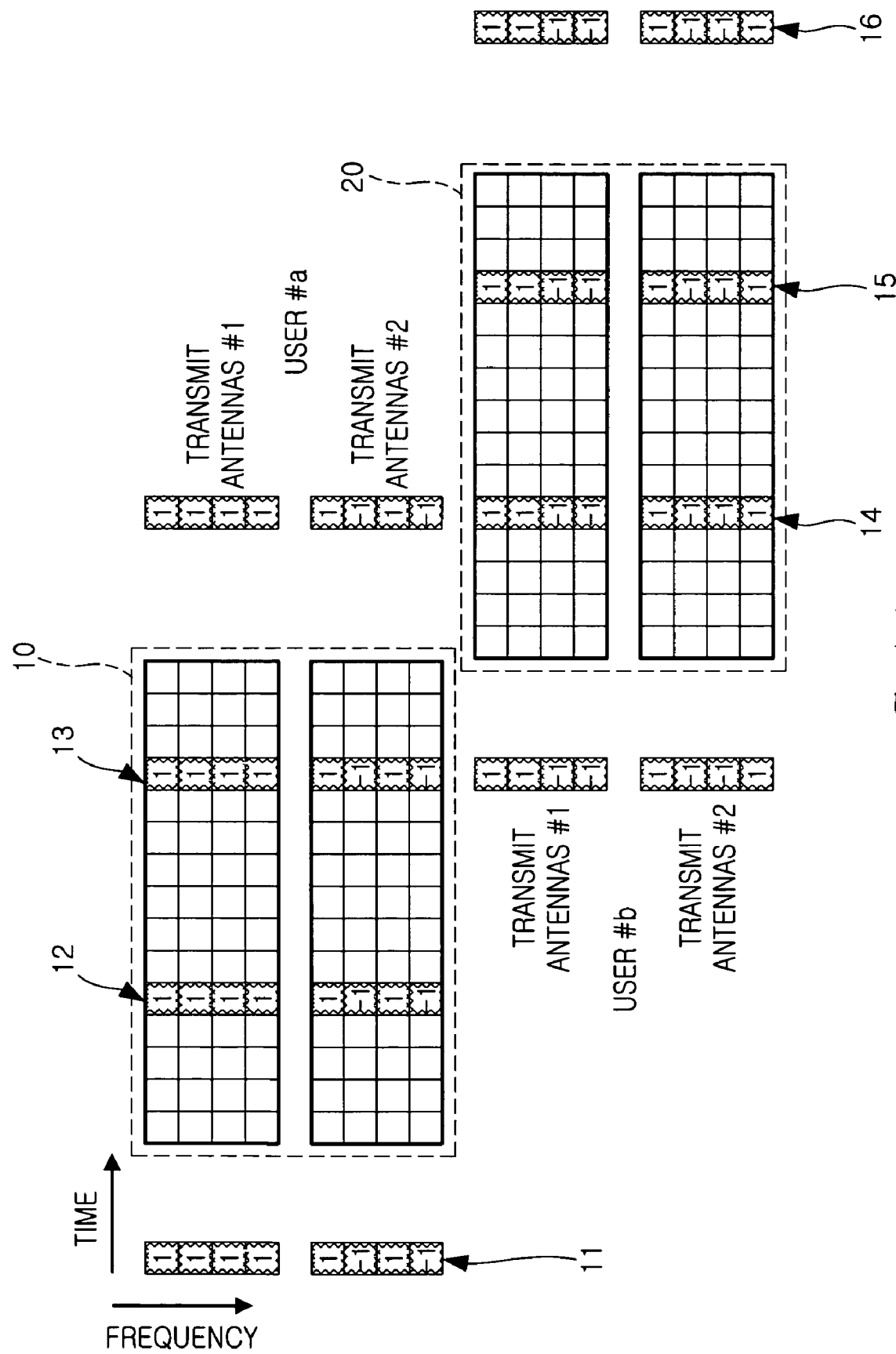
FIG. 11 is a conceptual view illustrating a pilot designing method according to a ninth embodiment of the present invention.

FIG. 11 is a conceptual view illustrating a pilot designing method according to the ninth embodiment of the present invention. Pilot signals are mapped to subcarriers allocated to the terminals for predetermined symbol periods. The ninth embodiment is similar to the fifth embodiment except for the change of position of the time axis and the frequency axis.

Transport blocks 10 and 20 allocated to user terminal #a and user terminal #b include pilot symbol periods 12 to 15 which are intermittently arranged with respect to data symbol periods. To compensate for the absence of pilot symbols at the time-domain start and end of the transport block 10 for user terminal #a, the transport block 10 shares pilot symbol periods 11 and 14 allocated to other user terminals, bordering on the transport block 10. Similarly, to compensate for the absence of pilot symbols at the time-domain start and end of the transport block 20 for user terminal #b, the transport block 20 shares pilot symbol periods 13 and 16 allocated to other user terminals, bordering on the transport block 20.

First and second antennas of user terminal #a share the transport block 10 and first and second antennas of user terminal #b share the transport block 20.

In this manner, under the assumption that the channel responses of two successive subcarriers are identical in the frequency domain, adjacent user terminals exchange their pilot symbol periods of one of subcarriers allocated to them, thereby enabling more accurate channel estimation.

In accordance with the present invention as described above, a predetermined number of pilot subcarriers (or pilot symbol periods) which are allocated to each user terminal, are shared with or exchanged with an adjacent user terminal. Therefore, virtually a greater number of pilot subcarriers (pilot subcarrier periods) than those that are allocated to the user terminal are used.

Also, the user terminal utilizes pilot subcarriers of its adjacent user terminal as its own without increasing a pilot subcarrier (pilot symbol period) allocation ratio for the user terminal. Hence, channel estimation performance is improved.

Since pilots signals are designed taking into account the use of multiple antennas in user terminals, an antenna diversity gain is achieved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A pilot designing method in an uplink orthogonal frequency division multiple access (OFDMA) system including a plurality of terminals where communications are carried out in a frame divided into time-frequency lattices, each time-frequency lattice being identified by frequency-axis subcarrier indexes and time-axis symbol period indexes and including a plurality of intermittently arranged pilot subcarriers, comprising the steps of:
dividing the frame into transport blocks of a predetermined size and allocating the transport blocks to terminals by the uplink OFDMA system; and
sharing pilot subcarriers of adjacent transport blocks allocated to different terminals in at least one symbol period.

2. The pilot designing method of claim 1, wherein the pilot subcarriers are shifted to other subcarrier indexes at predetermined symbol period intervals.

3. The pilot designing method of claim 2, wherein a transport block allocated to each terminal is shared by at least two antennas of the terminal.

4. The pilot designing method of claim 3, wherein the antennas map orthogonal pilot signals to pilot subcarriers in the transport block.

5. The pilot designing method of claim 2, wherein a pilot subcarrier is shared by the different terminals for four symbol periods.

6. The pilot designing method of claim 5, wherein a transport block allocated to each terminal is shared by at least two antennas of the terminal.

7. The pilot designing method of claim 6, wherein the pilot subcarrier is selectively allocated to the two antennas of the terminal for two successive symbol periods.

8. The pilot designing method of claim 7, wherein a pilot signal is mapped to pilot subcarriers having different indexes in the transport block for different symbol periods.

9. The pilot designing method of claim 6, wherein the pilot subcarrier is allocated to the two antennas of the terminal for the same two successive symbol periods.

10. The pilot designing method of claim 9, wherein a pilot signal is mapped to pilot subcarriers having different indexes in the transport block for different symbol periods.

11. The pilot designing method of claim 10, wherein the pilot signals mapped to the two antennas of the terminal are orthogonal to each other.

12. The pilot designing method of claim 5, wherein the pilot subcarrier is selectively allocated to at least two antennas of the terminal for a different symbol period.

13. The pilot designing method of claim 12, wherein a pilot signal is mapped to pilot subcarriers having different indexes in the transport block for different symbol periods.

14. A pilot designing method in an uplink orthogonal frequency division multiple access (OFDMA) system in, where communications are carried out in a frame divided into time-frequency lattices, each tame-frequency lattice being identified by frequency-axis subcarrier indexes and time-axis symbol period indexes and including a plurality of intermittently arranged pilot symbol periods, comprising the steps of:
dividing the frame into transport blocks of a predetermined size and allocating the transport blocks to terminals; and
sharing pilot symbol periods of adjacent transport blocks allocated to different terminals in at least one subcarrier.

15. The pilot designing method of claim 14, wherein a transport block allocated to each terminal is shared by at least two antennas of the terminal.

16. The pilot designing method of claim 15, wherein the antennas map orthogonal pilot signals to pilot symbol periods in the transport block.

17. The pilot designing method of claim 1, further comprising the step of:
receiving a frame with the shared pilot subcarriers between the adjacent transport blocks; and
estimating a channel of each of the terminals using pilot signals included in the received shared pilot subcarriers.

* * * * *